US008979329B1

(12) United States Patent
Moore et al.

(10) Patent No.: US 8,979,329 B1
(45) Date of Patent: Mar. 17, 2015

(54) METHOD AND APPARATUS FOR A CURVED WALL REFLECTOR ASSEMBLY

(75) Inventors: Michael Darrill Moore, Senoia, GA (US); Robert Allan Blalock, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 344 days.

(21) Appl. No.: 13/450,218

(22) Filed: Apr. 18, 2012

Related U.S. Application Data

(60) Provisional application No. 61/476,600, filed on Apr. 18, 2011.

(51) Int. Cl.

| | |
|---|---|
| ***F21V 7/00*** | (2006.01) |
| ***B21D 39/03*** | (2006.01) |
| ***G02B 5/08*** | (2006.01) |
| ***G02B 7/182*** | (2006.01) |
| ***F21V 7/09*** | (2006.01) |

(52) U.S. Cl.
CPC .......................................... *F21V 7/09* (2013.01)
USPC ............. 362/346; 362/364; 362/297; 29/428; 359/850

(58) Field of Classification Search
CPC ............ F21S 8/02; F21V 15/01; F21V 21/04; F21V 7/10
USPC ................... 362/346, 364, 297; 359/850, 855
See application file for complete search history.

(56) References Cited

U.S. PATENT DOCUMENTS

| | | | | |
|---|---|---|---|---|
| 5,287,259 | A * | 2/1994 | Lautzenheiser | 362/341 |
| 6,203,176 | B1 * | 3/2001 | Gordin | 362/350 |
| 8,371,726 | B2 * | 2/2013 | Collins et al. | 362/364 |
| 2009/0273938 | A1 * | 11/2009 | Wronski et al. | 362/346 |
| 2013/0135875 | A1 * | 5/2013 | Schutte et al. | 362/297 |

OTHER PUBLICATIONS

Philips Lightolier, Calculite, Matrix, Open Downlight, 4×4, Product Specification Sheet, Apr. 2009.
Philips Lightolier, Calculite, Matrix, Lensed Downlight, 4×4PL, Product Specification Sheet, Apr. 2009.
Philips Lightolier, Calculite, Matrix, Lensed Wall Washer, 4×4LW, Product Specification Sheet, Apr. 2009.

(Continued)

*Primary Examiner* — Jong-Suk (James) Lee
*Assistant Examiner* — Tsion Tumebo
(74) *Attorney, Agent, or Firm* — King & Spalding LLP

(57) ABSTRACT

A curved wall, square-shaped reflector assembly includes multiple reflector wall sections and multiple enclosure wall sections. Each reflector wall section is slidably coupled to a respective enclosure wall section by positioning a top reflector flange of the reflector wall section above a top support flange of the enclosure wall section and aligning alignment features on the enclosure wall section with holes on the reflector wall section. In addition, a bottom flange of the reflector wall section is positioned below a bottom edge of the enclosure wall section, thereby providing a consistent tension along the wall surface of the reflector wall section. Each enclosure wall section includes flange members on opposing side edges. Each of the combined reflector-enclosure wall sections are positioned orthogonal to one-another and coupled together along the adjacent flanges from the adjacent enclosure wall sections with rivets. The assembly reduces light leak without damaging the reflector surface.

17 Claims, 8 Drawing Sheets

(56) References Cited

OTHER PUBLICATIONS

Philips Lightolier, Calculite, Matrix, Lensed Downlight, 9×9PL, Product Specification Sheet, Oct. 2009.
Philips Lightolier, Calculite, LED, Square Downlight, C4×4L10DL, Product Specification Sheet, May 2009.
Cooper Lighting, IRIS, P406TAT, MH4BT, and E4DL E4DLCB, Product Specification Sheet, Feb. 26, 2008.
Cooper Lighting, IRIS, P406TAT, MH4CFL42E, and E4DL E4DLCB, Product Specification Sheet, Feb. 26, 2008.
Cooper Lighting, IRIS, P40832ICAT, P4081D26ICAT, P4081D32ICAT and E4DL E4DLCB, Product Specification Sheet, Mar. 30, 2012.

* cited by examiner

METHOD AND APPARATUS FOR A CURVED WALL REFLECTOR ASSEMBLY

RELATED PATENT APPLICATION

This application claims priority under 35 U.S.C. §119 to U.S. Provisional Patent Application Ser. No. 61/476,600, filed Apr. 18, 2011, and titled "Method and Apparatus for a Curved Wall Square Reflector Assembly," the entire contents of which are hereby incorporated herein by reference for all purposes.

TECHNICAL FIELD

The invention relates generally to recessed luminaires, and more particularly, to maintaining the integrity and shape of a multi-member reflector for a recessed luminaire.

BACKGROUND

A luminaire is a system for producing, controlling, and/or distributing light for illumination. For example, a luminaire can include a system that outputs or distributes light into an environment, thereby allowing certain items in that environment to be visible. Luminaires are sometimes referred to as "light fixtures."

A recessed lighting fixture is a light fixture that is installed in a hollow opening in a ceiling or other surface. A typical recessed lighting fixture includes a platform that is attached to the ceiling or wall structure. A reflector is mounted to the platform, and a lamp socket is coupled to the reflector. The lamp socket can be mounted directly to the reflector and/or platform. Alternatively, the lamp socket can be mounted to an upper reflector, which can be mounted to the reflector and/or platform. The lamp socket is configured to receive a light-emitting element, such as a incandescent, fluorescent, HID, halogen, or metal halide lamp, light-emitting diode (LED) (whether in the form of an LED lamp, LED bulb, LED linear strip, LED array, discrete LEDs, or LED chip on board, organic light emitting diode (OLED), or other type of light-emitting bulb. For simplicity, the term "light source" is used herein to refer to any light-emitting element.

The reflector can include a single member or multiple members that are joined together at one or more joints. Generally, the joints between the reflector members can be riveted or spot welded together. However, riveting, spot welding, and other traditional methods of joining members of a multi-member reflector are unsatisfactory because they typically result in poor structural integrity of the reflector. For example, traditional multi-member reflectors include gaps at the joints between members. These gaps can allow light to leak between the members, decreasing the efficiency and aesthetic value of the lighting fixture. In addition, the gaps can compromise the geometry of the reflectors and the quality of the resulting light output. For example, large gaps can cause a "square"-shaped reflector to have a non-square geometry, thereby changing the intended effect of the reflector on the light from the light-emitting element. Moreover, spot welding may cause deformation or degradation of the reflector surface.

SUMMARY

The present disclosure provides novel devices, systems, and methods for providing a curved wall, square-shaped reflector assembly that reduces light leak without deforming or damaging the reflector walls and maintains the proper positioning of the reflector walls. The disclosed curved wall, square-shaped reflector assembly protects the reflector walls. For one aspect of the present invention, the reflector assembly can include multiple enclosure sections. Each enclosure section can include an enclosure surface that has a first and second longitudinal edge. Each enclosure section can also include multiple attachment flanges. Each attachment flange can extend from one of the longitudinal edges of the enclosure section in a direction away from a light pathway. The reflector assembly can also include multiple reflector sections that are each releasably coupled to a respective enclosure section. In the reflector assembly, pairs of adjacent enclosure sections can be coupled together along the attachment flanges to form the joints of the reflector assembly.

For another aspect of the present invention, a method of assembling a reflector assembly can include the step of aligning multiple enclosure members in a predetermined geometric form. Each of the enclosure members can include at least two longitudinal edges and an attachment flange that extends from each of the longitudinal edges. The method can also include the step of removably coupling one of multiple reflective members to each respective enclosure member. Each reflective member can have a reflective surface that is disposed adjacent to the enclosure member. The method can also include the step of coupling each pair of adjacent enclosure members together with the adjacent attachment flanges.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

Reference will now be made to the accompanying drawings, which are not necessarily drawn to scale, and wherein.

Figure 1:
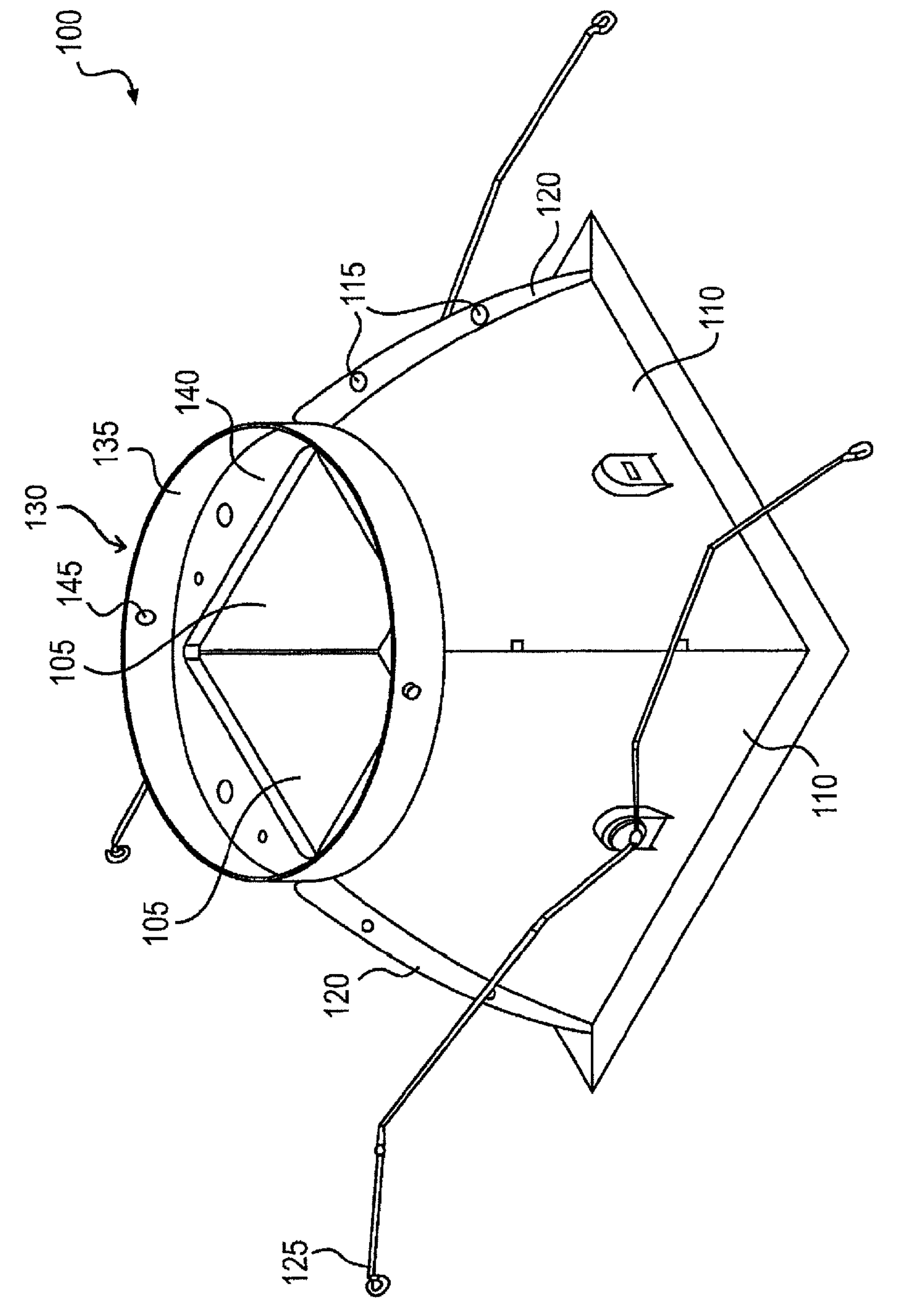
FIG. 1 is a perspective view of the curved wall, square-shaped reflector assembly in accordance with certain exemplary embodiments.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

Figure 2:
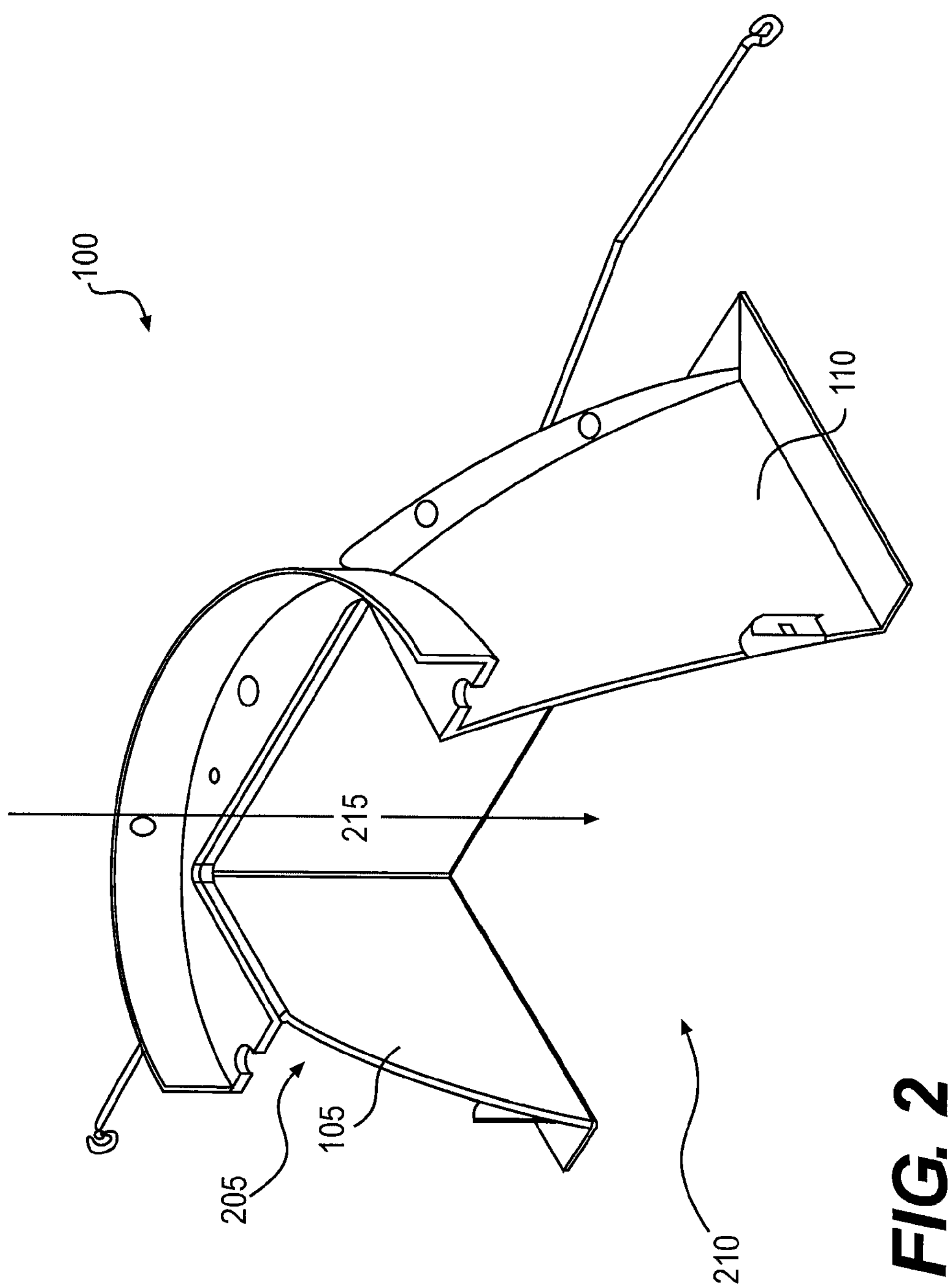
FIG. 2 is a section view of the curved wall, square-shaped reflector assembly of FIG. 1 in accordance with certain exemplary embodiments.
Figure 3:
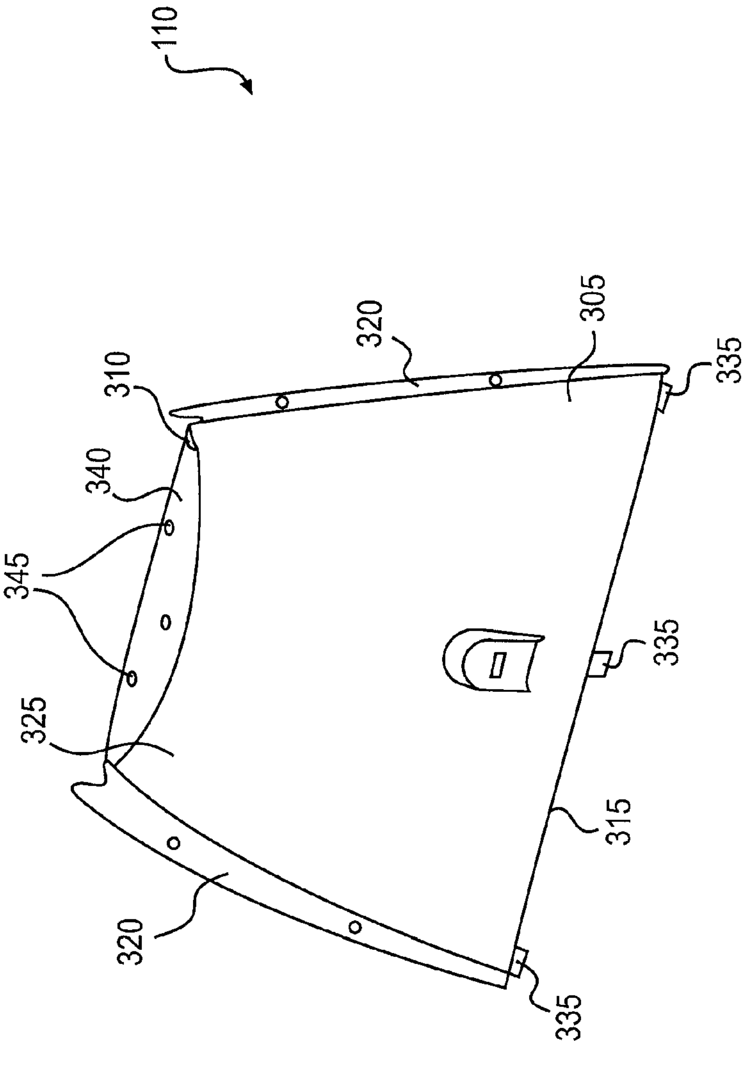
FIG. 3 is a perspective view of an enclosure section of the curved wall, square-shaped reflector assembly of FIG. 1 in accordance with certain exemplary embodiments.
Figure 4:
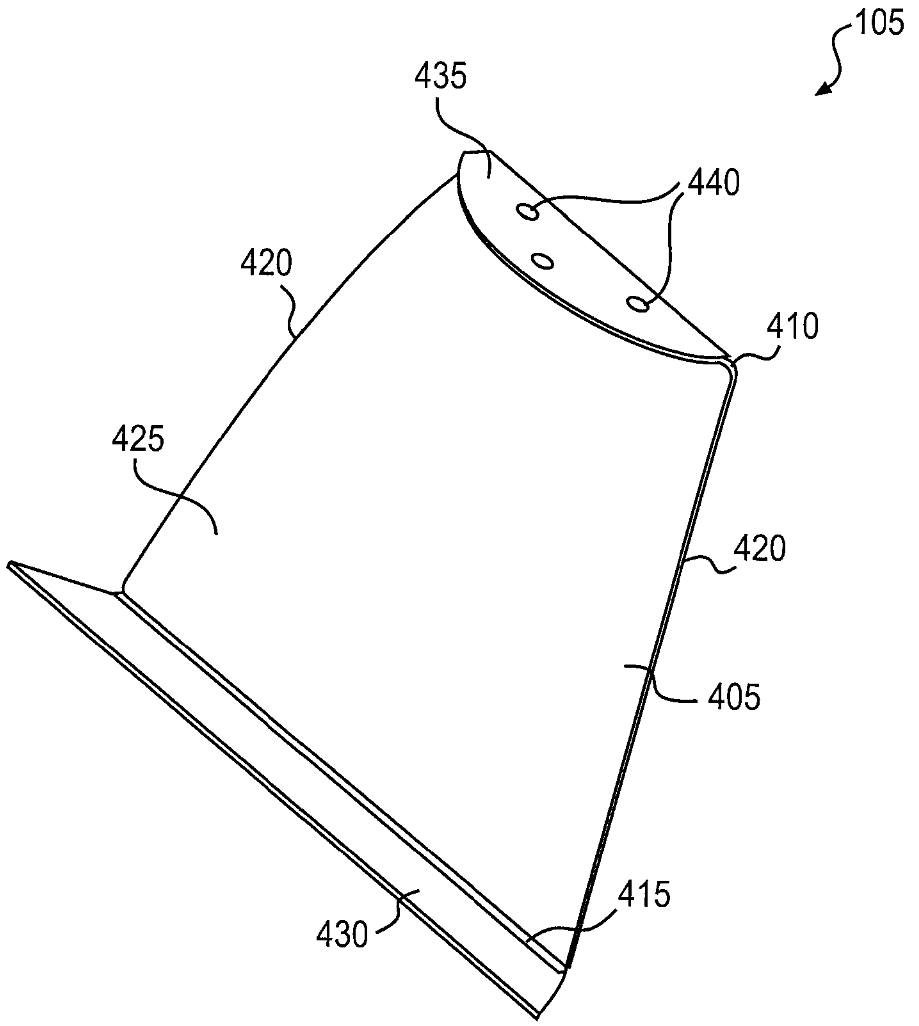
FIG. 4 is a perspective view of a reflector section of the curved wall, square-shaped reflector assembly of FIG. 1 in accordance with certain exemplary embodiments.

The exemplary embodiments described herein are directed to systems and devices for a curved wall square-shaped reflector assembly and methods of assembling the same. FIGS. 1 and 2 are perspective and section views respectively of the exemplary curved wall, square-shaped reflector assembly 100. FIG. 3 is a perspective view of an exemplary enclosure wall section 110 of the curved wall, square-shaped reflector assembly 100 of FIG. 1. FIG. 4 is a perspective view of an exemplary reflector section 105 for the curved wall, square-shaped reflector assembly 100 of FIG. 1. Referring now to FIGS. 1-4, the exemplary reflector assembly 100 includes reflector walls 105 that make up the interior surface of the reflector assembly 100 and outer enclosure wall sections 110 that make up the outer surface of the reflector assembly 100. The exemplary embodiment does not use any mechanical method to join the edges of the reflector walls 105 together. Instead, the reflector walls 105 are enclosed by the outer enclosure wall sections 110 and the enclosure wall sections 110 are held together by rivets 115. In certain exemplary embodiments, the rivets are located down a spine formed at the edge of the outer enclosure wall sections 110. As illustrated in the exemplary embodiment, the spine includes a flange 120 extending in an angled directed from the surface of the outer enclosure wall sections 110. The inner reflector walls 105 are not affected by this assembly method and thus have a more pleasing appearance. In certain exemplary embodiments, the spine also provides flat surfaces for keeping the assembly 100 square instead of parallelogram shaped. The exemplary assembly 100 includes four outer enclosure walls 110. While the exemplary embodiment teaches four outer enclosure wall sections 110 for a square-shaped assembly 100, the number of outer enclosure wall sections 110 could be less or more depending on the desired shape of the reflector assembly 100 and the performance requirements of the specific luminaire.

In certain exemplary embodiments, such as depicted in FIG. 1, the assembly 100 also includes a collar 130. The exemplary collar 130 has a circular or substantially circular-shaped vertical section 135 and a horizontal or substantially horizontally-shaped attachment base 140. In certain exemplary embodiments, the attachment base 140 is positioned along the top side of the top reflector flange 435 (see FIG. 4) and coupled to the enclosure wall sections 110 and the reflector wall sections 105 with rivets disposed through the attachment base 140, the top reflector flange 435, and the top support flange 340. In alternative embodiments, other attachment means known to those of skill in the art including, but not limited to welding, adhesives, and screws can be used to attach the attachment base 140 to the enclosure wall sections 110 and reflector wall sections 105. Further, in alternative embodiments, the attachment base 140 can be attached either to the enclosure wall sections 110 or the reflector wall sections 105 and not necessarily to both of them. The circular-shaped vertical section 135 includes one or more holes 145 for attaching the circular-shaped vertical section 135 to a luminaire or light engine of a light fixture. In certain exemplary embodiments, the collar 130 is made of metal or plastic and preferably of aluminum. In certain exemplary embodiments, all or portions of the collar 130 are painted or coated to have a black or dark color in order to absorb any light that may reach the collar 130 to prevent light leakage and/or undesirable light reflection within the assembly 100.

Depicted in FIG. 2 is a cross-section view of an exemplary assembly 100. As illustrated in FIG. 2, the assembly 100 directs the path of light from the top aperture 205 in the direction toward the bottom aperture 210 along arrow 215. In one exemplary embodiment, light travels along the path of light 215 from a light source located proximate the top aperture 205 to the exterior environment proximate the bottom aperture 210. In certain exemplary embodiments, the number and shape of the reflector walls 105 and outer enclosure wall sections 110 determine the shape of the bottom aperture 210. As illustrated in FIG. 2, the lower portion of the reflector walls 105 and outer enclosure walls 110 define the perimeter of the bottom aperture 210. In one exemplary embodiment, the assembly 100 includes four enclosure wall sections 110, coupled together as described below, to create a substantially rectangular or square bottom aperture 210. In certain exemplary embodiments, the shape of the bottom aperture 210 is defined by the bottom edge 315 of the enclosure wall sections 110 and/or the bottom edge 415 of the reflector wall sections 105. However, in alternative embodiments, fewer or greater numbers of enclosure wall sections 110 and/or reflector wall sections 105 are coupled together to create various shaped apertures. For example, a luminaire having a pentagon shape would include five reflector wall sections 105 and five enclosure wall sections 110.

As illustrated in FIG. 3, each enclosure wall section 110 has a wall surface 305 having a top edge 310, a bottom edge 315, and a pair of angled side edges 320. The enclosure wall 115 is typically made of metal or plastic. For example, in one exemplary embodiment, the enclosure wall 110 is made of steel. Wall surface 305 includes an inner face (not shown) and an outer face 325, with the outer face 325 being opposite the inner face. The exemplary wall surface 305 has an arcuate shape extending from the bottom edge 315 to the top edge 310. In one exemplary embodiment, the arcuate shape is a spline that is generally concave with respect to the path of light 215 through the assembly 100. In alternative embodiments, the shape of the wall surface 305 is straight or semi-circular. In other alternative embodiments, the wall surface has other shapes based on the designed light output characteristics and the light source characteristics chosen by a designer. When coupled to other enclosure wall sections 110, as described below, the inner face of the wall surface 305 faces the area of illumination through which light travels from the light source to the exterior environment. In one exemplary embodiment, the inner face of the wall surface 305 is painted or coated to have a black or dark color in order to absorb any light that may reach it to prevent light leakage and/or undesirable light reflection within the assembly 100. Alternatively, the inner face of the wall surface 305 can have any other color or reflective surface. In certain exemplary embodiments, the outer face 325 of one or more of the enclosure wall sections 110 includes a tab or mounting device 330 extending outward from the wall surface 305. The tab 330 is shaped to hold or receive therein or thereon a conventional torsion spring 125 (illustrated in FIG. 1). In certain exemplary embodiments, the torsion spring 125 holds the assembly 100 in place within a support structure, such as a ceiling, or within a luminaire mounting assembly, such as a recessed can housing, disposed within the support structure.

As illustrated in the exemplary embodiment depicted in FIG. 3, each side edge 320 includes a flange 120 that extends in an angled direction from the wall surface 305. In one exemplary embodiment, the angle of the flange 120 with respect to the wall surface 305 is about forty-five degrees. In alternative embodiments, the angle of the flange 120 with respect to the wall surface 305 can be anywhere between 5 and 175 degrees. The exemplary flange 120 includes one or more apertures therethrough for receiving a rivet 115 or other coupling device. When two enclosure walls 110 are positioned adjacent to one another and displaced about 90 degrees from one another, for the square-shaped assembly of presented in the exemplary embodiment, the flanges 120 included on the adjacent side edges 320 of the enclosure walls 110 are aligned or disposed next to one-another. A rivet 115 or other coupling device is positioned through the aligned apertures included in each of the two flanges 120, thereby coupling the two enclosure walls 110 together along the mated side edge 320. Alternatively, the apertures are eliminated and the adjacent flanges 120 are spot-welded together. The adjacent side edges 320 may also be joined together using other forms of chemical or mechanical bonding, such as, for example, chemical adhesives and mechanical fasteners.

According to the exemplary enclosure wall section 110 depicted in FIG. 3, the bottom edge 315 is substantially straight and includes one or more tabs 335 extending downward along the same plane as the enclosure wall surface 305. In one exemplary embodiment, the bottom edge 315 includes three tabs 335, although fewer or greater numbers of tabs 335 can be used and the change in the number of tabs is within the scope and spirit of this invention. Each tab 335 is, for example, made from the same material as the enclosure wall section 110. Alternatively, each tab 335 is made from a material different from the material of the enclosure wall section 110. In certain exemplary embodiments, each tab 335 has a flat or substantially flat horizontal surface that extends downward from the bottom edge 315 along the same plane as the enclosure wall surface 305 and provides a substantially even force against a corresponding flat flange surface 430 of a reflector wall section 105. Alternatively, the tab 335 mates with an opening or indention in a corresponding bottom support flange 430 (illustrated in FIG. 4) surface of a reflector wall section 105. In one exemplary embodiment, the bottom edge 315 and/or the inner face of the wall surface 305 is joined to the bottom support flange 430 and/or the outer face 425 of the reflector wall 105 section using other forms of chemical or mechanical bonding, such as, for example, chemical adhesives and mechanical fasteners. In one exemplary embodiment, a foam-backed adhesive tape is located between the reflector wall 105 section and a an enclosure wall section 110 on the same corresponding side of the reflector assembly. As the two sections are joined together, the foam backed tape is compressed and existing gaps between the two sections are filled. The foam backed tape may be adhered to either or both of the reflector wall 105 section and the enclosure wall section 110. In certain exemplary embodiments, the top edge 310 is substantially straight and horizontal. A top support flange 340 is coupled to top edge 310 and extends orthogonally, substantially orthogonally, and/or substantially horizontally away from the top edge 310 in a direction opposite the direction faced by the inner face of the enclosure wall surface 305. In one exemplary embodiment, the top support flange 340 is integral with the top edge 310 and the wall surface 305. Alternatively, the top support flange 340 is created separately and coupled to the top edge 310 by, for example, welding. The top support flange 340 includes alignment features 345 disposed along the upper surface of the top support flange 335. The alignment features 345 align with the top reflector flange 435 of a corresponding reflector wall 105 as described with reference to FIG. 4.

In certain exemplary embodiments, each reflector wall section 105 is slidably coupled or mated with an enclosure wall section 115 along the inside face of the wall surface 305. As illustrated in FIG. 4, an exemplary reflector wall 105 section includes a wall surface 405 having a top edge 410, a bottom edge 415, and angled side edges 420.

The reflector wall 105 is typically made of metal or plastic. In one exemplary embodiment, the reflector wall 105 is made of aluminum. In certain exemplary embodiments, the reflector wall 105 and the enclosure wall section 110 are constructed from different materials to accommodate for varying material properties and response when the assembly 100, in whole or in part, is exposed to light, heat, and force (compression, tension, bending, torsion, or shear). The reflector wall surface 405 includes an inner face (not shown) and an outer face 425, with the outer face 425 being opposite the inner face. The exemplary wall surface 405 has an arcuate shape extending from the bottom edge 415 to the top edge 410. In one exemplary embodiment, the shape of the curvature is a spline that is generally concave with respect to the path of light 215 through the assembly 100, however, other shapes can be used based on the light output characteristics and the light source characteristics chosen by a designer and the shape of the reflector walls 105. For example, a rectangular shaped reflector wall may be selected for a light source with a long lamp length, such as condensed florescent light bulb. When coupled to its enclosure wall section 110, as described below, the inner face of the reflector wall 105 faces the area of path of light 215 through the assembly 100, and the outer face 425, opposite the inner face, is disposed adjacent the inner face of the enclosure wall section 110. In one exemplary embodiment, the inner face of the reflector wall 105 is painted or coated to have a white or light, highly reflective, finish in order to reflect as much light as may come in contact with it. In an alternate embodiment, the inner face of the reflector wall 105 has a highly polished, reflective, metallic surface. In yet another alternative embodiment, the inner face of the reflector wall 105 can have any other color, metallic, or reflective surface.

As illustrated in FIG. 4, each side edge 420 has a curved shape that is substantially similar to the shape of the side edge 320 of the enclosure wall section 110. When each reflector wall section 105 is mated with its enclosure wall section 110 on the same corresponding side of the reflector assembly, and the enclosure wall sections 110 are coupled to one-another, each side edge 420 abuts the side edge 420 of another reflector wall segment 105 and substantially prevents light from passing between the two adjacent side edges 420. In certain exemplary embodiments, a filler material is located between adjacent side edges 420 and/or the enclosure wall section 110 and the reflector wall 105 to prevent light from passing between the adjoining reflector wall sections 105. In other exemplary embodiments, a blocking material is placed over the seam created where the adjoining reflector wall sections 105 mate to prevent light from passing between the side edges 420.

In one exemplary embodiment, four reflector wall sections 105 are positioned together as described above to create a substantially rectangular or square bottom aperture 210. In certain exemplary embodiments, the shape of the bottom aperture 201 is defined by the bottom edges 415 of the reflector wall sections 105. However, in alternative embodiments, fewer or greater numbers of reflector wall sections 105 are positioned together to create other shaped apertures.

The exemplary bottom edge 415 is disposed at an angle about three degrees from upward from the horizontal. In alternative embodiments, the bottom edge 415 is substantially straight and horizontal. In other alternative embodiments, the bottom edge 415 can be disposed anywhere between ten degrees down from the horizontal to ten degrees up from the horizontal. Providing a bottom edge 415 at an angle upward or downward from the horizontal, for example, a bottom edge 415 positioned at an angle three degree up from horizontal, improves the fit of the assembly 100 with the ceiling opening at the bottom side of the ceiling surface.

As illustrated in FIG. 4, the reflector wall 105 includes a bottom support flange 430 coupled to the bottom edge 415 and extending orthogonally, substantially orthogonally, and/or substantially horizontally away from the bottom edge 415 in a direction opposite that which is faced by the inner face of the reflector wall section 105. In certain exemplary embodiments, the top surface of the bottom support flange 430 is substantially flat and receives pressure from the one or more tabs 335 on the enclosure wall section 110. Alternatively, the top surface of the bottom support flange 435 includes corresponding, holes, slots or indentations 440 for receiving the tabs 335 and assisting in aligning the enclosure wall section 110 with the reflector wall section 105.

In certain exemplary embodiments, the top edge 410 is substantially straight and horizontal. The reflector wall 105 includes a top reflector flange 435 coupled to top edge 410 and extending orthogonally, substantially orthogonally, and/or substantially horizontally away from the top edge 410 in a direction opposite that which is faced by the inner face of the reflector wall section 105. The exemplary top reflector flange 435 includes indentations, holes, or slots 435 disposed therethrough or partially therethrough to receive the alignment features 345 disposed on the top side of the top support flange 340 to assist in aligning a reflector wall section 105 with its corresponding enclosure wall section 110.

In certain exemplary embodiments, the assembly 100 also includes one or more pieces of padding or filler material positioned between each enclosure wall 305 and each reflector wall 405. The padding can be coupled to either the enclosure wall 305, the reflector wall 405 or both. The padding provides increased stability and shaping characteristics between the enclosure wall 305 and the reflector wall 405. In certain exemplary embodiments, the padding is foam padding, however, other known elastic and inelastic padding materials can be substituted without departing from the spirit and scope of this disclosure.

To assemble the assembly 100, each reflector wall section 105 is releasably coupled to a enclosure wall section 110 by placing the top reflector flange 435 above the top support flange 340 and aligning the alignment features 345 with the holes 440 on the reflector wall section 105. The bottom flange 430 of the reflector wall section 105 is then positioned below the tabs 335 of the enclosure wall section 110. The tabs 335 provide a consistent tension along the wall surface 405 of the reflector wall section 105, keeping the reflector wall 105 snug against the wall surface 305 of the enclosure wall section 110, and also prevents the wall surface 405 of the reflector wall 105 from collapsing inward toward the path of light 215 through the assembly 100. In an alternative embodiment, adhesive or mechanical fasteners are used to couple each reflector wall section 105 with its enclosure wall section 110.

Once the four combined sections of reflector walls 105 and enclosure walls 110 are put together, the combined sections are positioned orthogonal or substantially orthogonal to one-another and coupled together along the adjacent flanges of each pair of combined sections with rivets or other attachment means. In one exemplary embodiment, the assembly 100 includes a collar 130 positioned above the coupled together sections and the attachment base 140 of the collar 130 is coupled to the top reflector flange 435 and the top support flange 340 using rivets or other attachment means.

Figure 5:
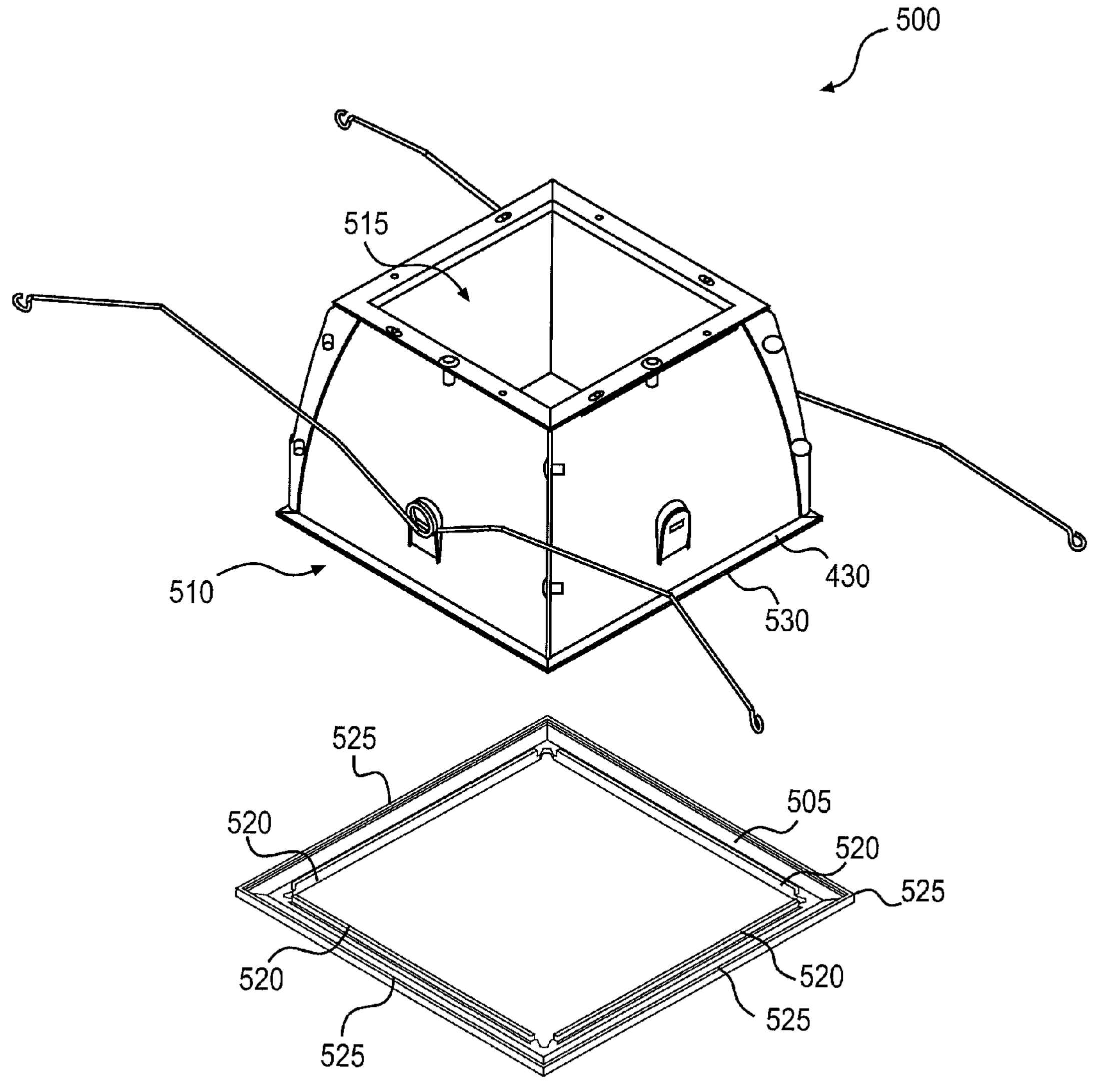
FIG. 5 is a perspective view of a curved wall, square-shaped reflector assembly in accordance with certain exemplary embodiments.

FIG. 5 is a perspective view of a curved wall square-shaped reflector assembly 500 with detachable trim 505 in accordance with certain exemplary embodiments. Referring now to FIG. 5, the exemplary assembly 500 includes a detachable trim element 505. In certain exemplary embodiments, the trim element 505 conceals exposed portions of the assembly 500 when mounted in a support structure, such as a ceiling, or within a luminaire mounting assembly disposed within the support structure. The trim element 505 is typically made of metal or plastic. In certain exemplary embodiments, the trim element 505 attaches to the bottom support flange 430 of the reflector wall 105 and defines the perimeter and shape of the bottom aperture 510. In certain exemplary embodiments, the trim element 505 provides certain decorative features as well as affects the quality and quantity of light emitted from the assembly 500.

The trim element 505 is attached to the assembly 500 by aligning the trim element 505 with the support flange 430 of the reflector wall 105, bottom edge 315 of the enclosure wall 110, and/or bottom aperture 510 and pushing the trim element 505 upon the support flange 430. As the trim element 505 moves toward the assembly 500 in the direction from the bottom aperture 510 towards the top aperture 515, retention portions 520, 525 of the trim element 505 engage the outside edge 530 and the inside edge (not shown) of the bottom support flange 430. In one exemplary embodiment, the retention portions 520, 525 provide a compressive force against portions of the bottom support flange 430 to hold the trim element 505 in place. In an alternate embodiment, the retention portions 520, 525 include extensions and/or recesses that mate with a portion of the outside edge 530 and the inside edge (not shown) of the bottom support flange 430. In an alternative exemplary embodiment, the trim element 515 is attached to the assembly 500 by aligning the trim element 505 with the top support flange 340, the top reflector flange 435, and/or top aperture 515 and moving the trim element 505 in the direction from the top aperture 515 towards the bottom aperture 510. As the trim element 505 moves towards the bottom aperture 510, retention portions 520 engage the wall surface 535 of the enclosure wall 110. It is contemplated that the trim element 505 can be installed on the assembly 500 before or after the assembly 500 being mounted in a support structure or within a luminaire mounting assembly.

Figure 6:
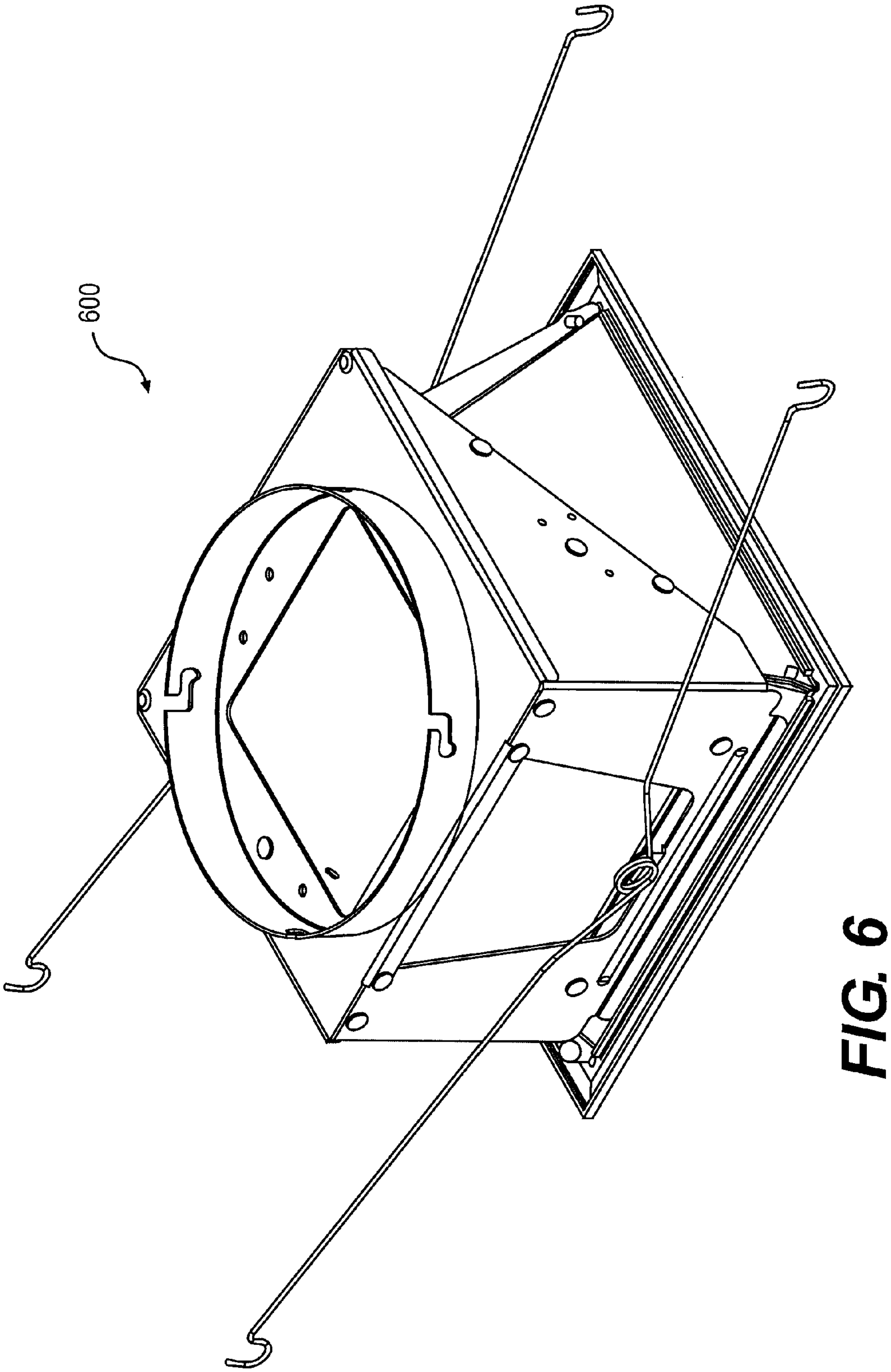
FIG. 6 is a perspective view of a curved wall, square-shaped reflector assembly in accordance with certain exemplary embodiments.
Figure 7:
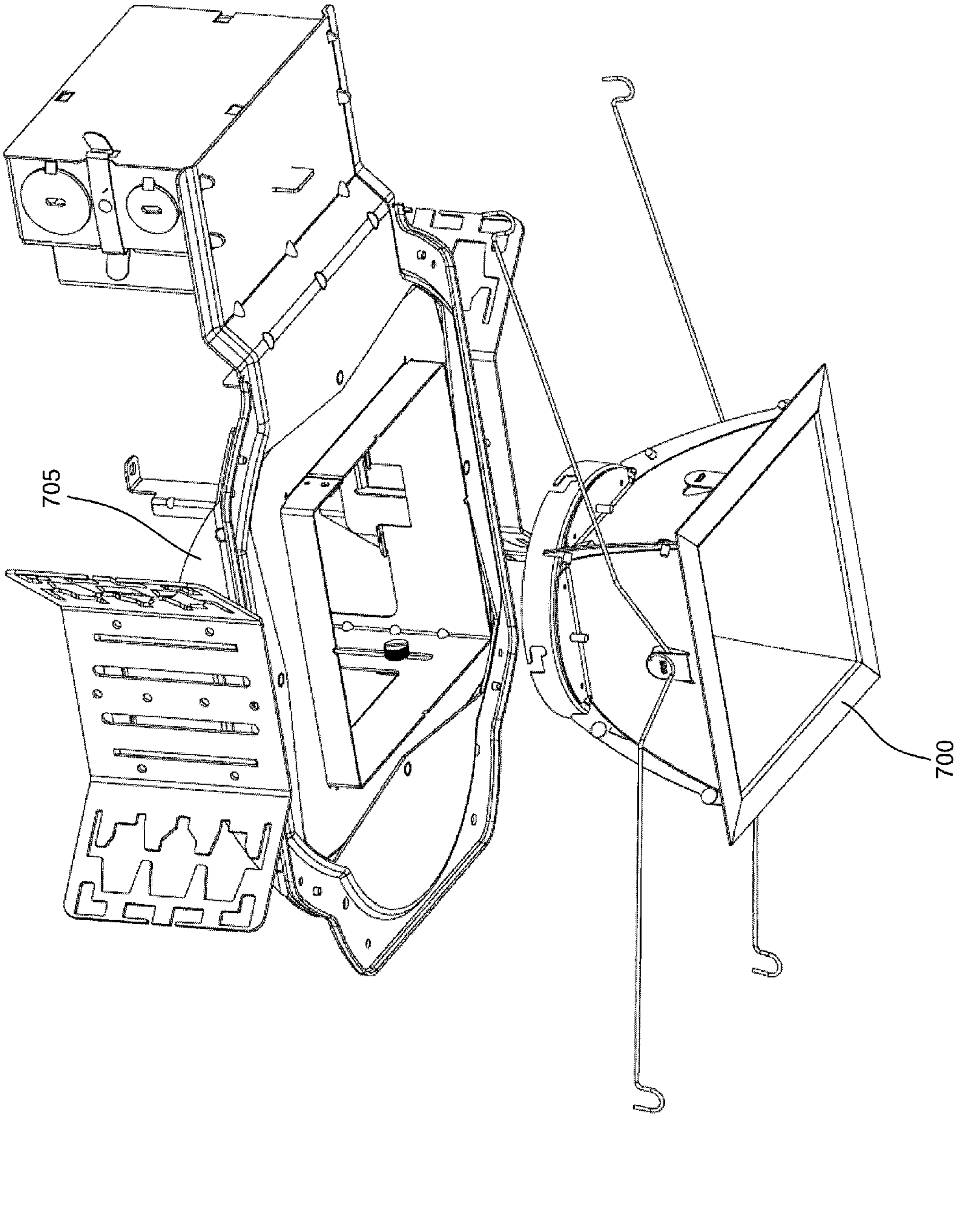
FIG. 7 is a perspective view of a curved wall, square-shaped reflector assembly and light figure in accordance with certain exemplary embodiments.
Figure 8:
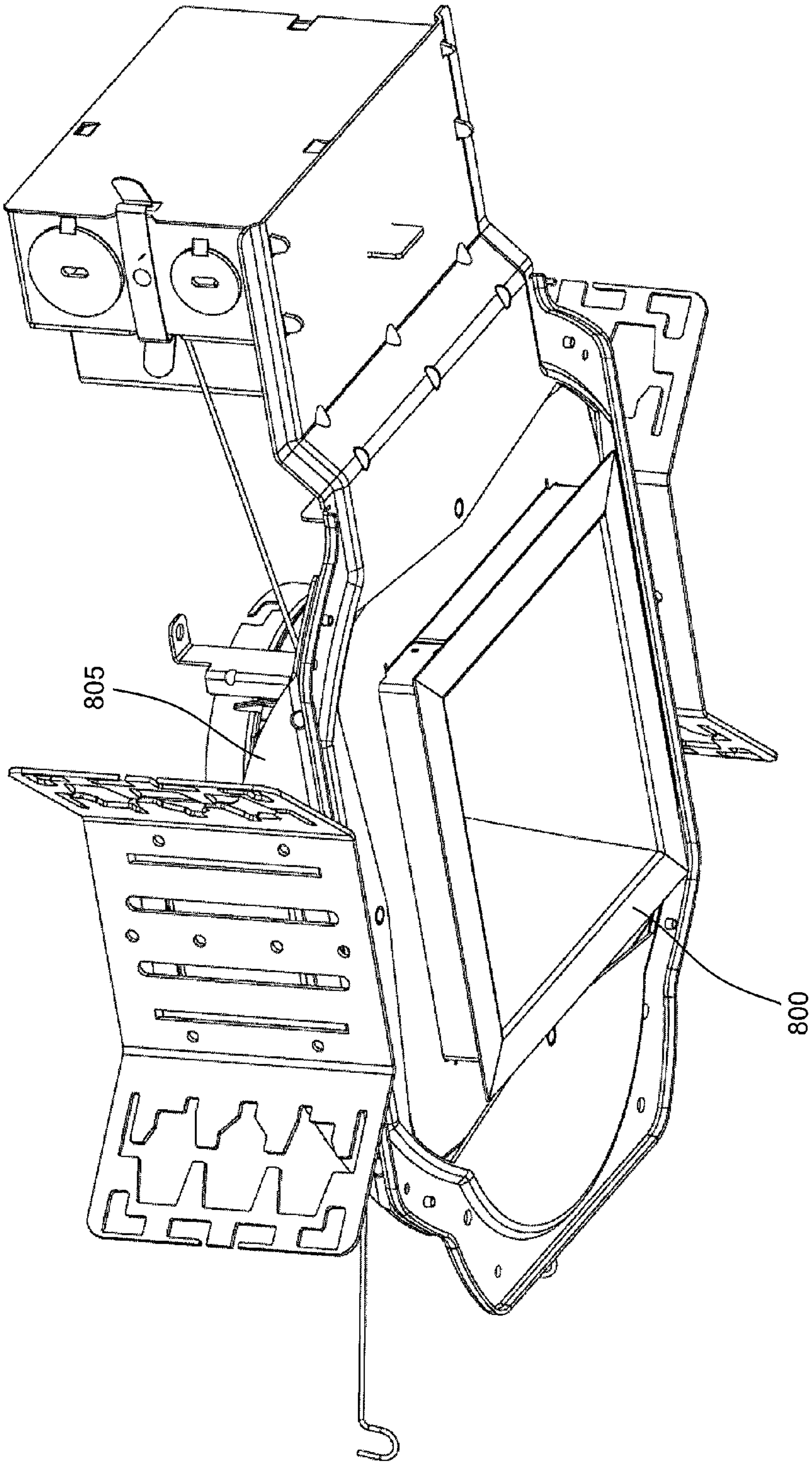
FIG. 8 is a perspective view of a curved wall, square-shaped reflector assembly and light fixture in accordance with certain exemplary embodiments.

The exemplary curved wall reflector assembly described herein can be incorporated into various styles of luminaires. For example, as illustrated in FIGS. 1-5, the curved wall reflector assembly can be installed in a direct, recessed lighting fixture. In an alternative embodiment, the curved wall reflector assembly can be provided in direct or indirect lighting fixtures, including, for example, recessed, pendant, ceiling or wall mounted, eyeball, and wall-wash type fixtures. As depicted in FIG. 6, the reflector assembly 600 can be provided in a recessed, wall-wash type light fixture housing. An alternative embodiment depicted in FIG. 7, illustrates the reflector assembly 700 and a recessed down-light fixture housing 705. The reflector assembly 700 is installed in the fixture housing 705 and mounted in/on a ceiling or other surface. FIG. 8 provides a perspective view of an exemplary reflector assembly 800 installed in a recessed down-light fixture housing 805.

Although the inventions are described with reference to exemplary embodiments, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is not limited herein.

What is claimed is:

1. A reflector assembly, comprising:
 a plurality of enclosure sections, each enclosure section comprising:
  an enclosure surface having a first and second longitudinal edge,
  a plurality of attachment flanges, each attachment flange extending from one of the longitudinal edges in a direction substantially normal to the plane of the respective enclosure surface,
  a top flange disposed substantially horizontally along a top edge of the enclosure section, and
  a plurality of tabs extending from a bottom edge of the enclosure section, wherein each of the plurality of tabs extends substantially along a same plane as the enclosure surface;
 a plurality of reflector sections, each of the plurality of reflector sections releasably coupled to one of the plurality of enclosure sections and comprising:
  a reflector surface having a top edge, a bottom edge and at least two side edges,
  a top flange disposed substantially horizontally along the top edge of the reflector surface,
  a bottom flange disposed substantially horizontally along the bottom edge of the reflector surface,
 wherein pairs of adjacent enclosure sections are coupled together along the attachment flanges to form joints of the reflector assembly, and
 wherein, for a paired reflector section and enclosure section, the top flange of the reflector section is disposed on top of and adjacent to the top flange of the enclosure section and the bottom flange of the reflector section is disposed below and abuts at least one of the plurality of tabs of the enclosure section when the reflector section is releasably coupled to the enclosure section.

2. The reflector assembly of claim 1, wherein at least one of the plurality of tabs apply a tension force to the reflector surface.

3. The reflector assembly of claim 1 further comprising a collar disposed adjacent to the top flange of each of the reflector sections and coupled to at least one of the top flanges of the reflector sections.

4. The reflector assembly of claim 1 further comprising a torsion spring removably coupled to an outer facing of at least one of the enclosure surfaces.

5. The reflector assembly of claim 1, wherein the plurality of enclosure sections comprise four enclosure sections arranged in a geometric form that defines a substantially rectangular opening at a base of the reflector assembly, and
 wherein each attachment flange extends from a corner of the reflector assembly.

6. The reflector assembly of claim 1, wherein each enclosure surface is spline-shaped.

7. The reflector assembly of claim 1, wherein each reflector surface is spline-shaped.

8. The reflector assembly of claim 1, further including a trim element coupled to the bottom flange of each reflector section.

9. The reflector assembly of claim 1, wherein the adjacent enclosure sections are coupled together along the attachment flanges using a chemical adhesive.

10. A reflector assembly comprising:
 a plurality of enclosure sections, each enclosure section comprising:
  an enclosure surface having a first and second longitudinal edge,
  a plurality of attachment flanges, each attachment flange extending from one of the longitudinal edges in a direction substantially perpendicular to an exterior of the enclosure surface, and
  a top flange disposed substantially horizontally along a top edge of the enclosure section;
 a plurality of reflector sections, each of the plurality of reflector sections releasably coupled to one of the plurality of enclosure sections and comprising:
  a reflector surface having a top edge, a bottom edge and at least two side edges,
  a top flange disposed substantially horizontally along the top edge of the reflector surface, and
  a bottom flange disposed substantially horizontally along the bottom edge of the reflector surface,
 wherein pairs of adjacent enclosure sections are coupled together along the attachment flanges to form joints of the reflector assembly, and
 wherein, for a paired reflector section and enclosure section, the top flange of the reflector section is disposed on top of and adjacent to the top flange of the enclosure section and the bottom flange of the reflector section is disposed below and adjacent to a bottom edge of the enclosure section when the reflector section is releasably coupled to the enclosure section.

11. The reflector assembly of claim 10, wherein the bottom edge of the enclosure sections and the bottom flange of the reflector section are coupled using at least one of an adhesive and a mechanical fastener.

12. The reflector assembly of claim 1, wherein each of the plurality of reflector sections are coupled to one of the plurality of enclosure sections using at least one of an adhesive and a mechanical fastener.

13. The reflector assembly of claim 12, where in the adhesive is adjacent to an interior surface of the enclosure section and an exterior surface of the reflector section.

14. A method of assembling a reflector assembly, comprising the steps of:
 aligning a plurality of enclosure members in a predetermined geometric form, each of the enclosure members having at least two longitudinal edges and an attachment flange extending from each of the longitudinal edges;
 coupling each pair of adjacent enclosure members together with the adjacent attachment flanges;
 providing a top flange disposed substantially horizontally along a top edge of each enclosure member;
 providing a plurality of tabs extending from a bottom edge of each enclosure member;
 removably coupling each one of a plurality reflective members to one of the enclosure members, each reflective member having a reflective surface disposed adjacent the enclosure member;
 providing a top reflector flange disposed substantially horizontally along a top edge of each reflective member;
 providing a bottom reflector flange disposed substantially horizontally along a bottom edge of each reflective member,
  wherein removably coupling each one of the plurality of reflective members to each of the enclosure members comprises:
 positioning the top reflector flange above and adjacent to the top flange; and positioning the bottom reflector flange below and abutting the plurality of tabs;

wherein the tabs apply a force against the bottom reflector flange and provide tension in the reflective member.

15. A method comprising:

aligning a plurality of enclosure members in a predetermined geometric form, each of the enclosure members having at least two longitudinal edges and an attachment flange extending from each of the longitudinal edges;

coupling each pair of adjacent enclosure members together with the adjacent attachment flanges;

providing a top flange disposed substantially horizontally along a top edge of each enclosure member;

removably coupling one of a plurality reflective members to each of the enclosure members;

providing a top reflector flange disposed substantially horizontally along a top edge of each reflective member;

providing a bottom reflector flange disposed substantially horizontally along a bottom edge of each reflective member, wherein removably coupling one of the plurality of reflective members to each of the enclosure members comprises:

positioning the top reflector flange above and adjacent to the top flange; and positioning the bottom reflector flange below and adjacent to a bottom edge of the enclosure member;

joining a portion of an interior surface of the enclosure member with a portion of an exterior surface of the reflector section using at least one of an adhesive and a mechanical fastener.

16. The method of claim 14 further comprising:

providing a trim element coupled to a bottom edge of the reflector assembly.

17. The method of claim 16 further comprising:

providing a bottom reflector flange disposed substantially horizontally along the bottom edge of each reflective member;

wherein the trim element is coupled to the bottom flange of each reflective member;

wherein coupling the trim element to the bottom flange comprises:

positioning a retention portion of the trim element adjacent to the bottom flange, and applying a compressive force from the retention portion to the bottom flange.

* * * * *